H. W. FORCE.
CARRIER FOR STEREOPTICONS.
APPLICATION FILED JUNE 5, 1907.
946,501.
Patented Jan. 11, 1910.
2 SHEETS—SHEET 2.
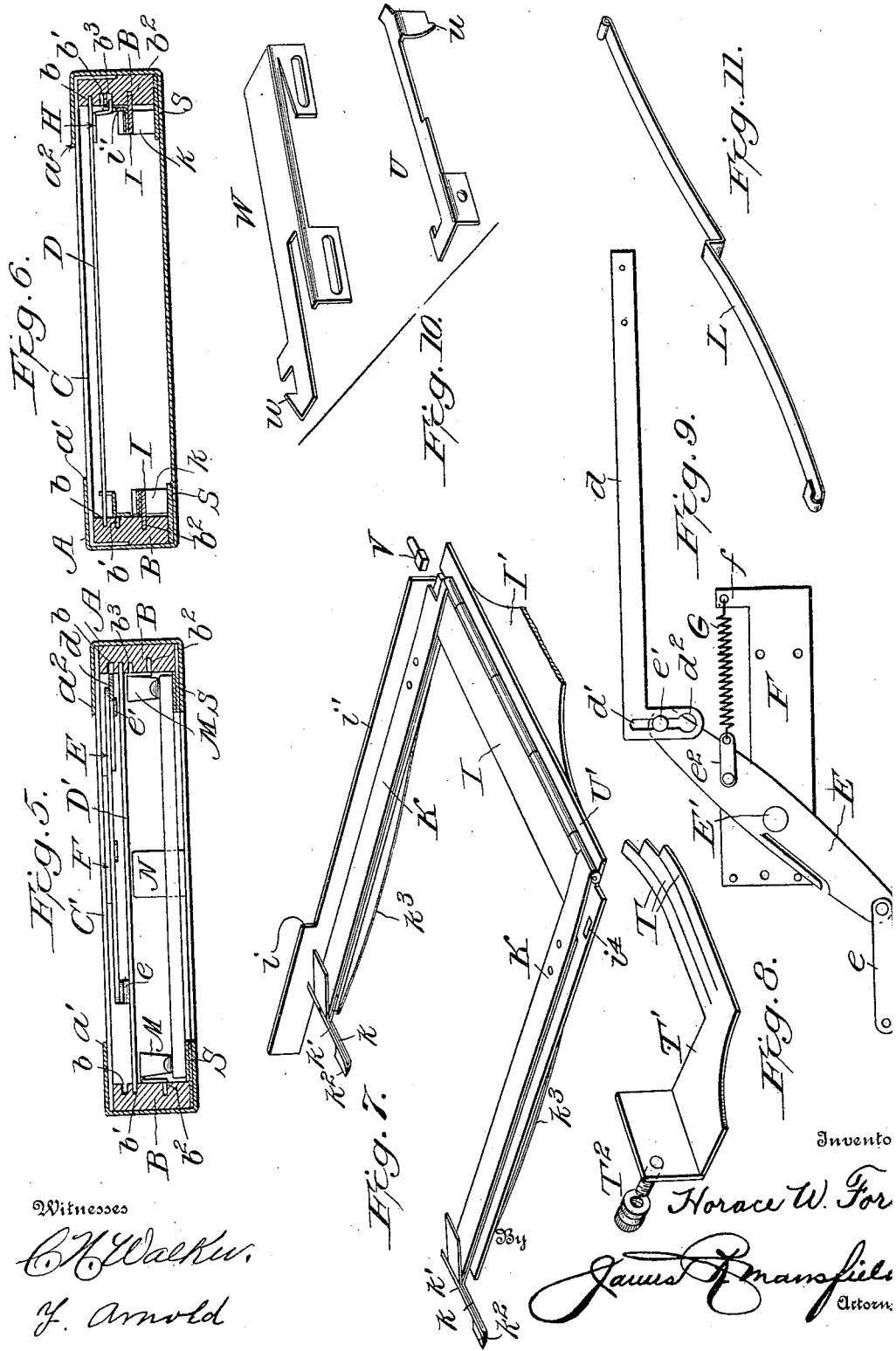

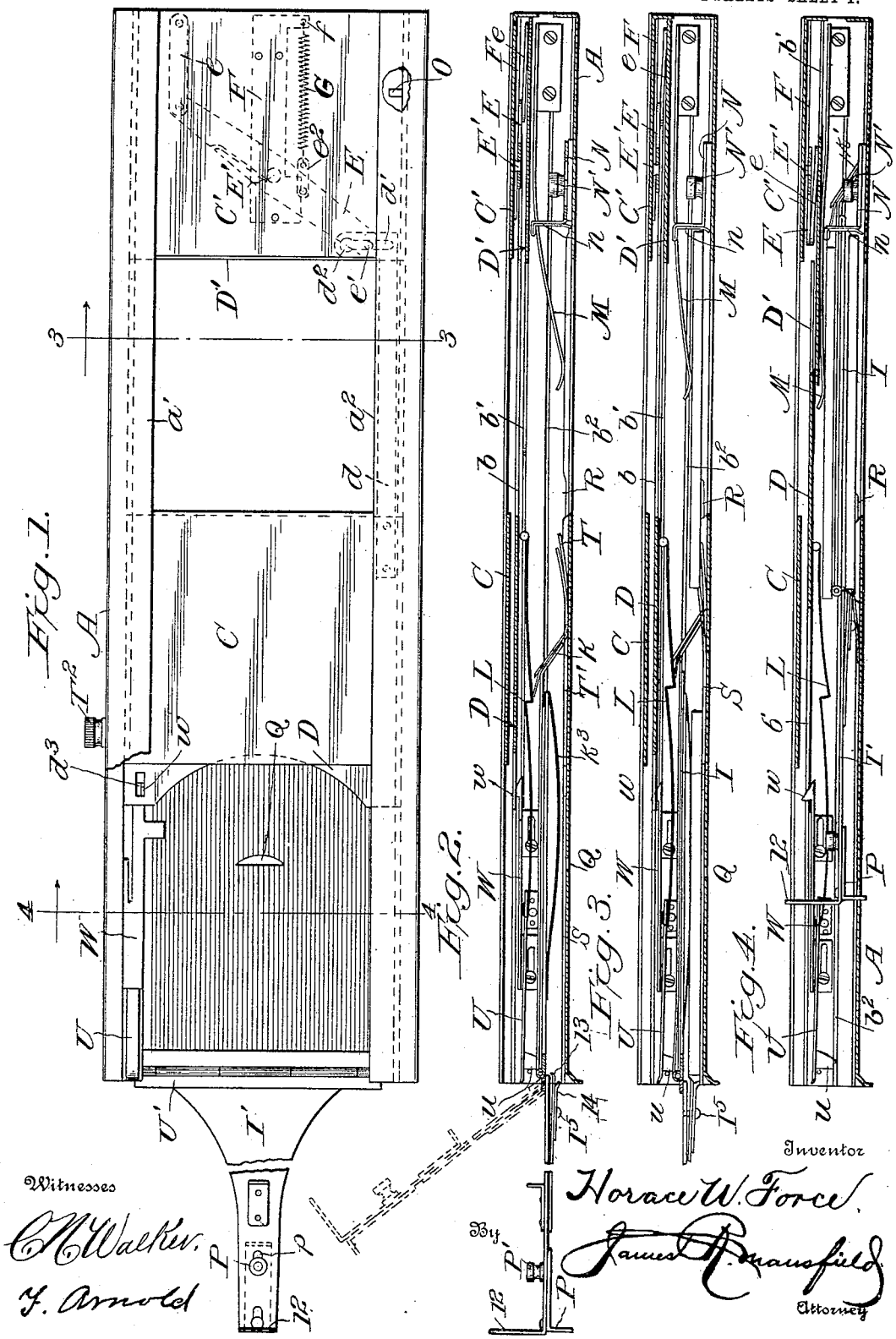

UNITED STATES PATENT OFFICE.

HORACE W. FORCE, OF NEWBURGH, NEW YORK.

CARRIER FOR STEREOPTICONS.

946,501.  Specification of Letters Patent.  Patented Jan. 11, 1910.

Application filed June 5, 1907. Serial No. 377,310.

*To all whom it may concern:*

Be it known that I, HORACE W. FORCE, citizen of the United States, residing at Newburgh, in the county of Orange and State of New York, have invented certain new and useful Improvements in Carriers for Stereopticons, of which the following is a specification.

This invention is an improvement in carriers for magic lanterns, stereopticons and the like and especially designed for use in single lanterns wherein the slides are exchanged behind closed shutters, the old slide being returned to point of entrance, and its object being to provide a device which will be simple and efficient in construction and can be operated more quickly than the ordinary devices now in use.

The improved device has a reciprocating frame and oppositely reciprocating shutters and guide ways which permit the slides to be put into position through one way and discharged at the point of entrance through another way, and means being also provided to permit the shifting effect to take place behind closed shutters so that all the operations can be performed automatically; when the shutters open the new picture is seen upon the screen and the old slide is at starting point, or at end of carrier near the operator ready for removal.

The invention consists in the novel combinations and constructions of parts as hereinafter described and claimed, and I will now describe the device in detail with reference to the accompanying drawings, which illustrate a practical form thereof.

Referring to the drawings: Figure 1 is an elevation of the complete carrier; Fig. 2 is a longitudinal sectional view of the carrier showing frame retracted and in position to receive a slide; Fig. 3 is a similar view showing one slide in position at the exposing opening and another slide at point of entrance; Fig. 4 is a similar view showing the shutters closed and the slides being exchanged, that is the first slide in position to be removed and the new slide at the exposing opening; Fig. 5 is a transverse section on line 3—3, Fig. 1. Fig. 6 is a transverse section on line 4—4, Fig. 1; Fig. 7 is a perspective view of the reciprocating frame; Fig. 8 is a perspective view of the registering stops; Fig. 9 is a plan view of the shutter operating mechanism; Figs. 10 and 11 are detail perspective views.

The carrier is designed to fit any regular lantern, and is placed in the front or general slideway of the machine and is removable at will; suitable means being provided for properly registering the carrier in the machine.

In the drawings, A designates the carrier frame, which may be made of wood or metal, but preferably the latter. The case A as shown is -shaped in cross section and provided with top and bottom front flanges $a'$, $a^2$, and is also provided with the usual exposing opening near one end of the carrier. Fitted in the carrier at the top and bottom thereof are wooden strips B, B, provided with grooves $b$, $b'$, $b^2$, for the shutters and reciprocating frame to slide therein as will be hereinafter explained.

At each side of the exposing opening plates C, C' are provided which strengthen the carrier, and are fitted under the flanges $a'$, $a^2$ and provided with angular turns adapted to fit behind the wooden strips B and may be held in place by screws through the outer edge of case; thus presenting a strong and substantial case.

The plate C' at the rear end of carrier supports on its under side, between said plate and rear shutter D' the mechanism that controls the shutters. The front shutter D operates under front plate C. As shown the shutters D, D', are divided and slide respectively in grooves $b$, $b'$, in the wooden strips B, B, and when the exposing opening is open the shutters are under the plates C, C'. The shutters are in normal position when closed.

Attached to shutter D is a bar $d$ connected to a swinging lever E which causes the shutters to act in unison. The rear shutter D' is loosely connected to the opposite end of the lever E by a short bar $e$, by studs riveted to rear of the shutter and to the lever but so as to move easily and freely. At the opposite end of lever E is a stud $e'$ which works in an elongated slot $d'$ on the outer end of bar $d$, said slot having an enlarged opening $d^2$ for the reception of stud $e'$ which will be found useful in assemblage and taking apart.

As shown the bar $d$ passes under the exposing opening, and is hidden from view by the flange $a^2$ of the carrier. The lever E is pivotally connected as at E' to a plate F which latter is riveted or otherwise secured to plate C'.

G represents a spiral spring having one end fastened to an arm $f$ of plate F and its opposite end is connected to a link $e^2$ which latter is loosely connected to the lever E at a point between the pivot E' and stud $e'$; this spring causes the shutters to close automatically.

At the bottom and front edge of shutter D is a projection or finger H bent so as to work in a groove $b^3$ in lower wooden strip B. This finger H is adapted to be engaged by an upstanding catch or shoulder $i$ of the reciprocating frame I and when the frame is drawn out to the end of case the shutters are opened.

I designates a reciprocating frame which slides in the grooves $b^2$ provided in both the upper and lower wooden strips. To the outer end of said frame is hinged a handle or operating lever I' having its outer end upturned as at $I^2$ for convenience in manipulation. The traveling frame is provided with an exposing opening of the same size as that of the opening in the carrier, primarily to lighten said frame and also to make it useful for other styles of carriers and different uses to which the carrier may be put. The lower side of the frame is provided with an upstanding flange $i'$ which prevents wearing of the groove $b^2$ and misplacement of the frame. The flange $i'$ has an upstanding catch or shoulder $i$ which engages the finger H on shutter D and causes both shutters to open, and to be held open as above explained.

The frame I has the same margin as the slide, and along the margins thereof metal strips K extend from the hinge to the opposite end and are preferably riveted to the frame near the handle point, and such strips having their outer ends $k$ bent down at an angle of approximately 35 degrees. On this angle part another plate of metal $k'$ is riveted, the outer and lower end of which is turned out flat as at $k^2$ to form what I term a foot; the upper end of plate $k'$ extends above the plate $k$ and forms a catch or hook, such end being beveled to provide a sharp edge to engage the end of the slide and to present a smooth surface for the slide to pass over and on to the reciprocating frame. These catches hold the slide when the frame is drawn back to the outer end of the case. Attached to the under side of frame I are two flat springs $k^3$, $k^3$, which assist in holding the slide to the back of the case.

L, L, represent two light bearing springs having one end fastened to wooden strips B, B, and their other end held free and located between the exposing opening and the outer, or operating end of the case, which assist in holding slides on the frame.

M, M, designate two bearing springs much like those in ordinary use except that in this instance they are reversed, and are intended to hold the slide over the exposing opening and are securely fastened at the rear end of the case to the wooden strips B, B.

Near the exposing opening at the rear of the carrier is an adjustably slotted plate or back stop N, having its front end upturned as at $n$ and turned back upon itself so as to form a cushioning spring for the slide, to prevent shock when the slide is pushed against it when placed in position. This stop may be held in place by the screw and nut N', or if desired may be riveted to the back of case A; and prevents the slide being pushed too far back in the carrier and at the same time prevent the slide moving away when being transferred to the reciprocating frame I.

In the lower wooden strip B is provided near the rear end of the case a pin O which marks the extreme action of the reciprocating motion of frame I, and is also conveniently located to stop the frame when slides $3\frac{1}{4} \times 3\frac{1}{4}$ are used, or with 4 inch slides. The shock caused by insertion of a slide is also prevented by a device at end of handle of frame I, and as shown it consists of an angle piece P placed under the end of handle I' and held in place by set screw P' through slotted opening $p$ in the handle. The angle piece P drops in opening Q in the back of the case.

The means for pushing the new slide forward is located under the handle I' and consists of a spring plate $I^3$ having its outer end riveted to the handle and its inner end free and upturned sufficiently to press on the surface of the slide to hold it against the back of the case. A short plate $I^4$ is riveted to the plate $I^3$ near its inner end and has its outer end turned down and is used to push the slide through the carrier. A stud $I^5$ may be provided near the hinge and connected to the handle I' and pass through both plates $I^3$, $I^4$ for the purpose of holding the spring plates in fixed limits.

In order to have the foot of each lifting spring pass under the slide to lift it with certainty a space is provided under the end of the slide as it rests over the exposing opening. This is made by having a depression R in the bed of the case so as to have the slide elevated. Thin strips of metal S may be provided running the entire length of the case under both of the wooden strips B, B, and suitably fastened and extending out to the top and bottom of the exposing opening giving the same margin found on slides or the reciprocating frame. The depression is formed by cutting out the metal strips just beneath the end of the slide as it rests over the exposing opening. The feet $k$ of the frame drop into these places and pass under the end of the slide, or short strips of metal may be fastened to the long metal strips at each side of the exposing opening leaving space under the end of the slide. In both methods however metal strips are fastened on the back of the case just inside of the metal strips S, and extend up to the exposing opening to support that end of the slide; the bottom of the feet are beveled so as to slide up the slight incline caused by making this space. Either method forms a space and the feet of the lifting springs pass under the end of the slide with certainty and without any trouble whatever.

After the slide has been placed over the exposing opening the lifting springs of frame I passing back over said slide would tend to draw it back again, but for a device to check it. This I call a registering stop and consists of several spring teeth T formed from one side of an adjustable base T', said base being passed under the wooden strip B at the top of the case and turned up behind the same and held in place by the screw and nut T² on the outside edge of the case. These springs are of different lengths one for 3¼ x 3¼ slides one for 3¼ x 4 inch slides and another for slides that are sometimes used which are slightly longer than 4 inches. As shown the stop lies flat on the back of the case and the spring fingers extend toward the exposing opening and of sufficient height to arrest a slide after passing over the suitable stop and to hold the slide in place. There may be as many stops as necessity requires and they are readily adjusted for any particular size of slide.

Situated on the under side of upper wooden strip B at the outer end of the case is a device for holding the traveling frame and which also hold the shutters open while a slide is being removed and it consists of the locking spring U which is provided with a finger $u$ that engages a slot $i^4$ in the frame I when the frame is drawn out thus permitting the withdrawal of the slide and the handle is turned at right angles to insert the next slide. A bar U' is arranged across the front of the handle and made fast to the latter and adjacent the hinge and of a width to nearly fill the space between the wooden strips B, B, and adapted to trip the locking spring U and permit the frame to move forward caused by tension of the spiral spring G attached to lever E. A pin V in lower wooden strip engages the lower end of said bar U' and holds the frame in check and of course the shutters open. This pin also prevents drawing the frame out too far. A slide is now inserted, the handle turned down, and the slide pushed forward over exposing opening. In connection with this locking spring, a sliding spring catch W is provided, and adapted to lock the shutters open by means of an upstanding beveled catch $w$ entering slot $d^3$ in front shutter D at the same time it is adapted to raise the locking spring U as the latter is unnecessary when the carrier is operated without shutters. When used in this way mica with ground glass surface may be provided for the exposing opening of the reciprocating frame, or exposing opening in frame may be fitted if desired with a thin sheet of metal of lighter weight than that of which the frame I is made.

It will be observed that the new slide is introduced under the old slide and the latter is transferred to the frame and is carried back to the point of entrance, and does not slide back.

The operation of the frame places a slide over the exposing opening, and transfers the old slide to the frame and returns it to the point of entrance. On the inward movement of the frame the shutters are caused to close and are so held until a new slide is placed in position at the exposing opening and the old slide is withdrawn by the frame, and when said frame has reached a point where the rear end of said old slide has passed the exposing opening the shutters are instantly opened.

Obviously various changes in construction may be made without departing from the spirit of the invention.

What I therefore claim as new and desire to secure by Letters Patent thereon is:

1. An optical lantern, a carrier therefor, in combination with a traveling frame having a hinged handle, said hinged connection adapting the handle to be turned through ninety degrees toward the right to permit the introduction of slides, and means for locking said frame in the carrier.

2. In a carrier for lanterns, a casing, a traveling frame therein, having hinged operating handle adapted to push a slide to position between said frame and the back of said casing, means for returning the slide to same end of carrier on the front of said frame, and means on said handle adapted to enter an opening in the back of said casing thereby preventing shock at back stop and to assist in registering a slide.

3. In a slide carrier, a shutter therein, the combination of a movable frame, a locking device therefor, said frame having a hinged handle adapted to be turned to the right at right angles to trip said locking device thereby holding said frame fast and to keep the shutters open while the returned slide is being removed, a pin in the lower part of the carrier and means on said frame to engage said pin, substantially as described.

4. In a slide carrier, shutters therein, the combination of a traveling frame, a locking device therefor, a pin in the lower part of the carrier, said frame having a hinged handle, a bar across the base of said handle and projecting beyond the sides thereof, adapted to trip said locking device at its upper end, and its lower end adapted to engage said pin to hold said frame fast and also the shutters open until next exchange of slides and permit introduction of slides.

5. In a carrier for lanterns a casing, a traveling frame therein, having hinged operating handle adapted to push a slide to position between said frame and back of carrier, means for returning the slide to same end of carrier on the front of said frame; with shutters in said carrier, means on said frame for causing the shutters to open when the frame is drawn back, and means for locking said frame to hold the shutters open.

6. In a carrier for lanterns, a traveling frame therein, provided with hinged operating handle, a pair of shutters, said frame adapted to release said shutters, and to push a slide forward to position, means on said frame for raising the slide at the exposing opening and to transfer it to said frame, a projecting lug or catch on the frame to engage a lug or catch on one of said shutters to cause the shutters to open when the frame is drawn back.

7. In a carrier, for lanterns, a traveling frame therein, provided with hinged operating handle, a pair of shutters, said frame adapted to release said shutters, and to push a slide forward to position, means on said frame for raising the slide at the exposing opening and to transfer it to said frame, a projecting lug or catch on the frame to engage a lug or catch on the outer shutter to cause the shutters to open when the frame is drawn back, and a spring locking device at end of carrier adapted to hold the frame when drawn back thereby preventing the shutters from closing until the frame is again pushed forward.

8. In a slide carrier, the combination of opposed members, a bar having one end connected to one of said members and adapted to pass around the exposing opening, the opposite end of said bar connecting with one end of a swinging lever, and the opposite end of said lever being connected to the other of said members, and a traveling frame in said carrier for operating said members.

9. In a carrier for lanterns, the combination of opposed members, a bar having one end rigidly connected to one of said members, the opposite end of said bar connecting with one end of a pivoted lever and the opposite end of said lever being connected to the other of said members by a short bar, a spring attached to said pivoted lever adapted to cause said lever to act in one direction and cause said members to close.

10. In a carrier, removable grooved strips located in the top and bottom thereof, self-closing shutters adapted to slide therein, a bar connected with one of said shutters and to a swinging lever pivotally connected to the case, the opposite end of said lever being connected to the other of said shutters, a traveling frame in said carrier provided with a hinged handle; with means on the frame for causing said shutters to open, and a sliding spring catch for causing said shutters to be thrown out of action.

11. In a slide carrier, the combination of a reciprocating slide carrying frame in said carrier a pair of oppositely traveling shutters, a pivoted lever to which said shutters are connected whereby the shutters are adapted to act in unison, a part carried by one of said shutters disposed in the path of said frame, a spring for causing the shutters to close automatically in one direction when the shutters are released; whereby the shutters are closed during the insertion and withdrawal of slides, and open when the rear edge of removed slide passes the exposing opening.

12. In a slide carrier, a pair of oppositely reciprocating shutters, a pivoted lever to which said shutters are connected whereby the shutters are adapted to act in unison, a spring causing the shutters to close automatically when the shutters are released; a lug on one of said shutters and a reciprocating frame in said carrier provided with a flange adapted to engage said lug when the frame is retracted.

13. In a slide carrier, the combination of a reciprocating frame, a pair of oppositely movable shutters in said carrier, controlling mechanism for said shutters, a catch on the frame, a finger on one of said shutters adapted to engage said catch to open the shutters, and springs for holding the slide on said frame.

14. In a carrier, the combination of a reciprocating frame, a pair of oppositely movable shutters in said carrier, controlling mechanism for said shutters, a projection on the frame, a finger on one of said shutters adapted to engage said projection to open the shutters, springs for holding the slide on said frame, and a second set of springs for holding slide over the exposing opening.

15. In a carrier, the combination of a reciprocating frame, a pair of shutters, controlling mechanism therefor, an adjustable cushioning device to prevent shock when slide is placed over exposing opening and to prevent an old slide moving away while being transferred to the frame..

16. In a carrier having an exposing opening and strengthening plates, the combination of a reciprocating frame provided with hinged operating handle, a pair of oppositely movable shutters, controlling mechanism therefor located under one of said strengthening plates, an adjustable backstop near the exposing opening to prevent shock when slide is placed over the exposing opening and to prevent old slide moving away while being transferred to the frame.

17. In a carrier, the combination of a reciprocating frame provided with hinged handle, a pair of shutters, controlling mechanism therefor, an adjustable cushioning device to prevent shock when slide is placed over the exposing opening, and a shoulder on the upper end of said cushioning device to hold the slide being removed, parallel to that of the slide being inserted, and a stop at the inner end of the carrier for limiting the inward movement of the frame.

18. In a slide carrier, having an exposing opening the combination of a frame provided with a hinged operating handle at its outer end, and means on said handle for pushing a slide over the exposing opening.

19. In a carrier, the combination of a traveling frame provided with a hinged operating handle at its outer end, and means on said handle for pushing a slide over the exposing opening, and means for locking the frame when retracted.

20. In a carrier, the combination of a reciprocating frame, a pair of shutters, controlling mechanism therefor, an adjustable cushioning device to prevent shock when a slide is placed over the exposing opening; with an adjustable registering stop in said carrier for registering a slide at the exposing opening.

21. In a carrier having an exposing opening the combination of a reciprocating frame, a pair of oppositely movable shutters, controlling mechanism therefor, an adjustable backstop near the exposing opening to prevent shock when a slide is placed over the exposing opening; with an adjustable registering stop in said carrier adjacent the exposing opening for properly registering a slide at the exposing opening.

22. In a carrier, the combination of a reciprocating frame, a pair of oppositely movable shutters, controlling mechanism therefor; with an adjustable registering stop provided with a series of fingers adapted to register a slide at the exposing opening.

23. In a carrier, the combination of a reciprocating frame, a pair of shutters movable in opposite directions, controlling mechanism therefor; with an adjustable registering stop in said carrier adjacent the exposing opening provided with a series of fingers of varying lengths adapted to register a slide at the exposing opening.

24. In a slide carrier, the combination of a reciprocating frame, a pair of oppositely movable shutters in said carrier, controlling mechanism for said shutters, a catch on the frame a finger on one of said shutters adapted to engage said catch to open shutters; with a locking spring adapted to engage a slot in the frame to hold the shutters closed, and means on said frame for causing the release of said locking spring so that the frame can be operated.

25. In a carrier, the combination of a reciprocating frame, a pair of oppositely movable shutters in said carrier, controlling mechanism for said shutters, a projection on the frame, a finger on one of said shutters adapted to engage said projection to open the shutters, springs for holding the slide on said frame, and a second set of springs for holding the slide over the exposing opening; with a locking spring provided with a catch adapted to engage a slot in the frame to hold the shutters closed, and means on said frame for causing the release of the catch so that the frame can be reciprocated.

26. In a carrier, the combination of a reciprocating frame, a pair of oppositely movable shutters, controlling mechanism therefor; with a spring catch adapted to engage a slot in the end of one of said shutters and hold said shutters opened until released by said frame.

27. In a carrier, the combination of a reciprocating frame, a pair of shutters movable in opposite directions, controlling mechanism therefor; with a sliding spring catch adapted to enter a slot in the end of the front shutter and hold the shutters opened until released by said frame.

28. In a carrier, the combination of a traveling frame, provided with feet at its inner end, strips placed in carrier above and below the exposing opening provided with depressions near the exposing opening into which the feet of the frame drop for the purpose of lifting the slide at the exposing opening to be removed from the carrier.

29. In a slide carrier, the combination of a reciprocating frame, provided with lifting feet at its inner end, metal strips placed in the carrier above and below the exposing opening on which the slide rests and provided with depressions at the end of the slide for the feet of the frame to enter and thereby lift the slide to the frame for the purpose of withdrawing the same from the carrier, all substantially as described.

In testimony whereof I affix my signature in presence of two witnesses.

HORACE W. FORCE.

Witnesses:
JOHN D. NORMOYLE,
JAMES R. MANSFIELD.